US011461905B2

(12) United States Patent
Lee et al.

(10) Patent No.: US 11,461,905 B2
(45) Date of Patent: Oct. 4, 2022

(54) DETERMINING A KINEMATIC SEQUENCE

(71) Applicant: Sony Group Corporation, Tokyo (JP)

(72) Inventors: Jong Hwa Lee, San Diego, CA (US); Brent Faust, SanDiego, CA (US); Kenji Suzuki, Tokyo (JP); Arun Chandrasekar, San Diego, CA (US); Joseph Moon, Timnath, CO (US); Xihe Zhang, Santa Clara, CA (US)

(73) Assignee: Sony Group Corporation, Tokyo (JP)

(*) Notice: Subject to any disclaimer, the term of this patent is extended or adjusted under 35 U.S.C. 154(b) by 332 days.

(21) Appl. No.: 16/577,940

(22) Filed: Sep. 20, 2019

(65) Prior Publication Data

US 2020/0320719 A1    Oct. 8, 2020

Related U.S. Application Data

(60) Provisional application No. 62/830,869, filed on Apr. 8, 2019, provisional application No. 62/830,845, filed on Apr. 8, 2019.

(51) Int. Cl.
*G06K 9/00* (2022.01)
*G06T 7/246* (2017.01)
(Continued)

(52) U.S. Cl.
CPC .......... *G06T 7/246* (2017.01); *A63B 24/0006* (2013.01); *A63B 69/3623* (2013.01);
(Continued)

(58) Field of Classification Search
CPC ........ G06F 3/011; G06F 3/017; G06F 3/0346; G06F 3/0325; G06F 1/1662; G06F 3/014;
(Continued)

(56) References Cited

U.S. PATENT DOCUMENTS 7,450,736 B2   11/2008   Yang
2007/0086622 A1*  4/2007   Sun .................. G06V 10/24
                                           382/173
(Continued)

FOREIGN PATENT DOCUMENTS

CN         105184861          2/2019

OTHER PUBLICATIONS

Haiyu Zhu, et al. "Dynamic Human Body Modeling Using a Single RGB Camera"—School of Electronic Science and Engineering, Nanjing University, Nanjing 210023, China—16 pages.
(Continued)

*Primary Examiner* — Alex Kok S Liew
(74) *Attorney, Agent, or Firm* — Trellis IP Law Group, PC

(57) ABSTRACT

Implementations generally relate to determining a kinematic sequence. In some implementations, a method includes obtaining a video of a person performing an action. The method further includes determining from the video a plurality of points associated with the person, where the determining of the plurality of points is performed for each frame of the video. The method further includes converting two-dimensional (2D) coordinates of the plurality of points to three-dimensional (3D) coordinates, where the converting is performed for each frame of the video. The method further includes determining a movement of the plurality of points based at least in part on the 3D coordinates.

20 Claims, 13 Drawing Sheets

(51) Int. Cl.
*G09B 19/00* (2006.01)
*A63B 24/00* (2006.01)
*A63B 69/36* (2006.01)
*G06K 9/62* (2022.01)
*G06T 7/20* (2017.01)
*G06V 40/20* (2022.01)
*A63B 71/06* (2006.01)
*A63B 102/32* (2015.01)

(52) U.S. Cl.
CPC ............ *G06K 9/6232* (2013.01); *G06T 7/20* (2013.01); *G06V 40/23* (2022.01); *G09B 19/0038* (2013.01); *A63B 71/0622* (2013.01); *A63B 2024/0015* (2013.01); *A63B 2071/0647* (2013.01); *A63B 2102/32* (2015.10); *A63B 2220/05* (2013.01); *A63B 2220/806* (2013.01); *A63B 2230/62* (2013.01); *G06T 2207/10016* (2013.01); *G06T 2207/30196* (2013.01); *G06T 2207/30221* (2013.01)

(58) Field of Classification Search
CPC ............ G06F 1/163; G06F 2203/0384; G06F 3/04815; G06F 7/76; G06F 16/71; G06F 16/7837; G06F 16/9024; G06F 3/01; G06F 3/0383; G06F 16/29; G06F 16/90335; G16H 20/30; G16H 40/67; G16H 80/00; G16H 10/60; G16H 50/30; G16H 20/10; G16H 20/40; G16H 40/63; G16H 50/50; G16H 50/70; G16H 50/20
See application file for complete search history.

(56) References Cited

U.S. PATENT DOCUMENTS

2014/0254883 A1* 9/2014 Kim .................. G06T 7/246
382/107
2018/0174347 A1* 6/2018 Chaney ................ G06T 13/40

OTHER PUBLICATIONS

Swinguru Pro https://www.swinguru.com/golf/ The Professional All-in-One Golf Studio Solution 2019—12 pages.
GolfDB: A Video Database for Golf Swing Sequencing https://www.groundai.com/project/golfdb-a-video-database-for-golf-swing-sequencing/ Mar. 15, 2019—13 pages.
Swingbot—Artificial Intelligence Software Whose Mission Is To Help Golfers Improve Their Swing http://techcompanynews.com/meet-swingbot-artificial-intelligence-software-whose-mission-is-to-help-golfers-improve-their-swing/ Dec. 14, 2018—7 pages.

* cited by examiner

500

DETERMINING A KINEMATIC SEQUENCE

CROSS REFERENCE TO RELATED APPLICATIONS

This application claims priority from U.S. Provisional Patent Application No. 62/830,845, entitled "KINEMATIC SEQUENCE ESTIMATION USING DEEP LEARNING," filed Apr. 8, 2019 and U.S. Provisional Patent Application No. 62/830,869, entitled "PREDICTION OF GOLF SWING CHARACTERISTICS," filed Apr. 8, 2019, which are hereby incorporated by reference as if set forth in full in this application for all purposes.

This application is related to U.S. patent application Ser. No. 16/577,945, entitled "DETERMINING GOLF SWING CHARACTERISTICS," filed Sep. 20, 2019, which is hereby incorporated by reference as if set forth in full in this application for all purposes.

BACKGROUND

Some mobile applications for teaching activities such as sports are able to facilitate in analyzing form and movement. Such applications rely on multiple hardware sensors that are attached to several points on a person's body. Such sensors may include inertial measurement unit (IMU) sensors. An IMU sensor is an electronic device that measures an object's specific force, angular rate, and orientation of the body. An IMU sensor may use a combination of accelerometers, gyroscopes, and sometimes magnetometers to take measurements. In some scenarios, a vest with multiple sensors may be worn by a person and multiple cameras may be used to facilitate analysis of a person's movement.

SUMMARY

Implementations generally relate to determining a kinematic sequence. In some implementations, a system includes one or more processors, and includes logic encoded in one or more non-transitory computer-readable storage media for execution by the one or more processors. When executed, the logic is operable to cause the one or more processors to perform operations including: obtaining a video of a person performing an action; determining from the video a plurality of points associated with the person, where the determining of the plurality of points is performed for each frame of the video; converting two-dimensional (2D) coordinates of the plurality of points to three-dimensional (3D) coordinates, where the converting is performed for each frame of the video; and determining a movement of the plurality of points based at least in part on the 3D coordinates.

With further regard to the system, in some implementations, the action is a golf swing. In some implementations, the video is captured by a two-dimensional camera. In some implementations, the plurality of points includes points of a body of the person. In some implementations, the plurality of points includes points of a golf club held by the person. In some implementations, the 2D coordinates are pixel coordinates. In some implementations, the 3D coordinates are Cartesian coordinates.

In some embodiments, a non-transitory computer-readable storage medium with program instructions thereon is provided. When executed by one or more processors, the instructions are operable to cause the one or more processors to perform operations including: obtaining a video of a person performing an action; determining from the video a plurality of points associated with the person, where the determining of the plurality of points is performed for each frame of the video; converting two-dimensional (2D) coordinates of the plurality of points to three-dimensional (3D) coordinates, where the converting is performed for each frame of the video; and determining a movement of the plurality of points based at least in part on the 3D coordinates.

With further regard to the computer-readable storage medium, in some implementations, the action is a golf swing. In some implementations, the video is captured by a two-dimensional camera. In some implementations, the plurality of points includes points of a body of the person. In some implementations, the plurality of points includes points of a golf club held by the person. In some implementations, the 2D coordinates are pixel coordinates. In some implementations, the 3D coordinates are Cartesian coordinates.

In some implementations, a method includes: obtaining a video of a person performing an action; determining from the video a plurality of points associated with the person, where the determining of the plurality of points is performed for each frame of the video; converting two-dimensional (2D) coordinates of the plurality of points to three-dimensional (3D) coordinates, where the converting is performed for each frame of the video; and determining a movement of the plurality of points based at least in part on the 3D coordinates.

With further regard to the method, in some implementations, the action is a golf swing. In some implementations, the video is captured by a two-dimensional camera. In some implementations, the plurality of points includes points of a body of the person. In some implementations, the plurality of points includes points of a golf club held by the person. In some implementations, the 2D coordinates are pixel coordinates.

A further understanding of the nature and the advantages of particular implementations disclosed herein may be realized by reference of the remaining portions of the specification and the attached drawings.

DETAILED DESCRIPTION

Implementations generally relate to determining a kinematic sequence. Implementations described herein provide a machine learning algorithm, pipeline and web application for measurement of a person's body movements. Various example implementations are described herein in the context of determining a golf player's body movements. Implementations may be used, for example, to determine kinematic sequences, to determining swing characteristics, and to detect errors in movement form.

In some implementations, a method includes obtaining a video of a person performing an action. The method further includes determining from the video a plurality of points associated with the person, where the determining of the plurality of points is performed for each frame of the video. The method further includes converting two-dimensional (2D) coordinates of the plurality of points to three-dimensional (3D) coordinates, where the converting is performed for each frame of the video. The method further includes determining a movement of the plurality of points based at least in part on the 3D coordinates.

Figure 1:
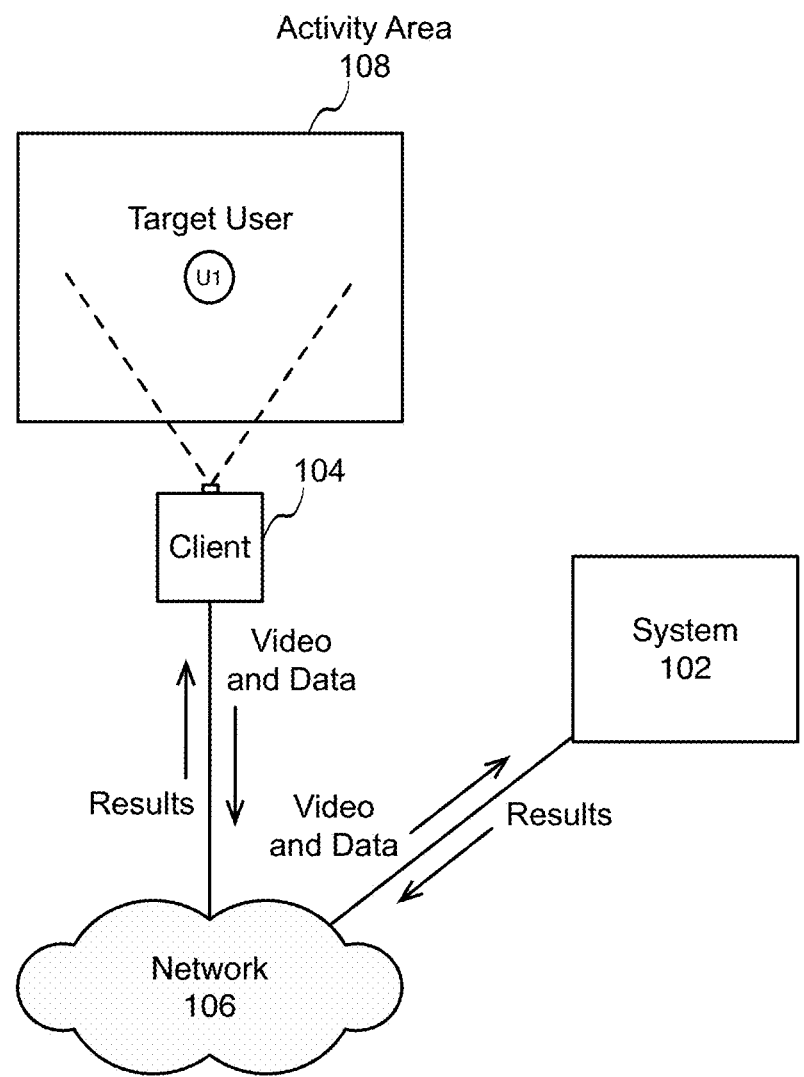
FIG. 1 is a block diagram of an example activity environment for determining movement of a person, which may be used for implementations described herein.

FIG. 1 is a block diagram of an example activity environment 100 for determining movement of a person, which may be used for implementations described herein. In some implementations, environment 100 includes a system 102, which communicates with a client 104 via a network 106. Network 106 may be any suitable communication network such as a Wi-Fi network, Bluetooth network, the Internet, etc.

As described in more detail herein, a camera of client 104 captures a video of a person U1 in an activity area 108. Person U1 may also be referred to as a target user U1. In some implementations, activity area 108 may be a sporting area, and target user U1 may be an athlete in the sporting area. For example, target user U1 may be a golfer on a course. System 102 utilizes deep machine learning and computer vision techniques to detect and measure a person's body movements. For example, the system may determine the movements of the head and joints of the target user as the person swings a golf club. As described in more detail herein, the system may determine kinematic sequences, determining swing characteristics, as well as determine errors in the form or technique of the target user.

While some implementations are described herein in the context of golf, these implementations and others may also be applied to other activities and/or sports involving determining the movement of one or more people. Further embodiments directed to the determining of the movement of a person are described in more detail herein.

For ease of illustration, FIG. 1 shows one block for each of system 102, client 104, network 106, and activity area 108. Blocks 102, 104, 106, and 108 may represent multiple systems, client devices, networks, and activity areas. Also, there may be any number of people on a given activity area. In other implementations, environment 100 may not have all of the components shown and/or may have other elements including other types of elements instead of, or in addition to, those shown herein.

While system 102 performs embodiments described herein, in other embodiments, any suitable component or combination of components associated with system 102 or any suitable processor or processors associated with system 102 may facilitate performing the embodiments described herein.

Figure 2:
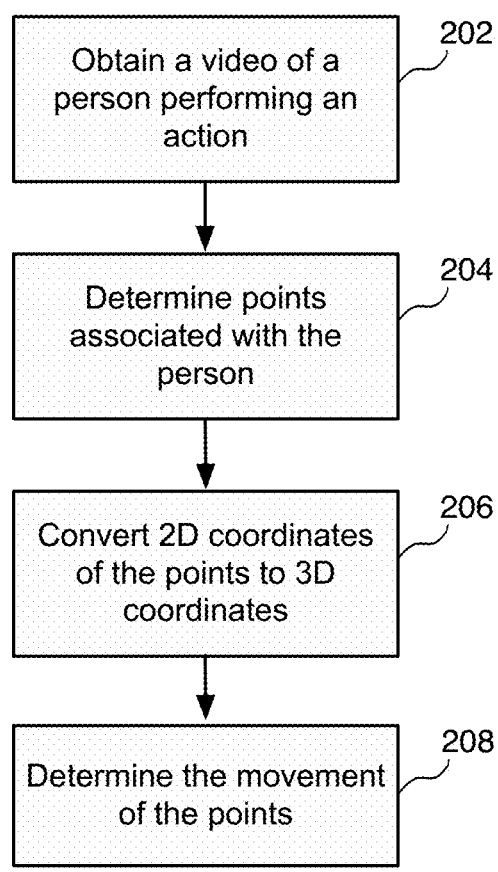
FIG. 2 is an example flow diagram for determining a kinematic sequence, according to some implementations.

FIG. 2 is an example flow diagram for determining a kinematic sequence, according to some implementations. Referring to both FIGS. 1 and 2, a method is initiated at block 202, where a system such as system 102 obtains a video of a person performing an action. In various implementations, the action is a golf swing. For example, the video may be of a person/target user swinging a golf club at a golf ball. In various implementations, the system may obtain the video using any suitable camera. For example, the video may be captured using a dedicated video camera, a camera that is integrated into a smart phone or other device, etc. In various implementations, the video is captured by a two-dimensional camera.

At block 204, the system determines, from the video, points associated with the person. In various implementations, the system determines the points for each frame of the video. In various implementations, points associated with the person may represent various predetermined locations on the person's body. In various implementations, the points associated with the person include points of a body of the person. Various example implementations directed to points associated with a user are described in more detail below in connection with FIG. 3, for example.

Figure 3:
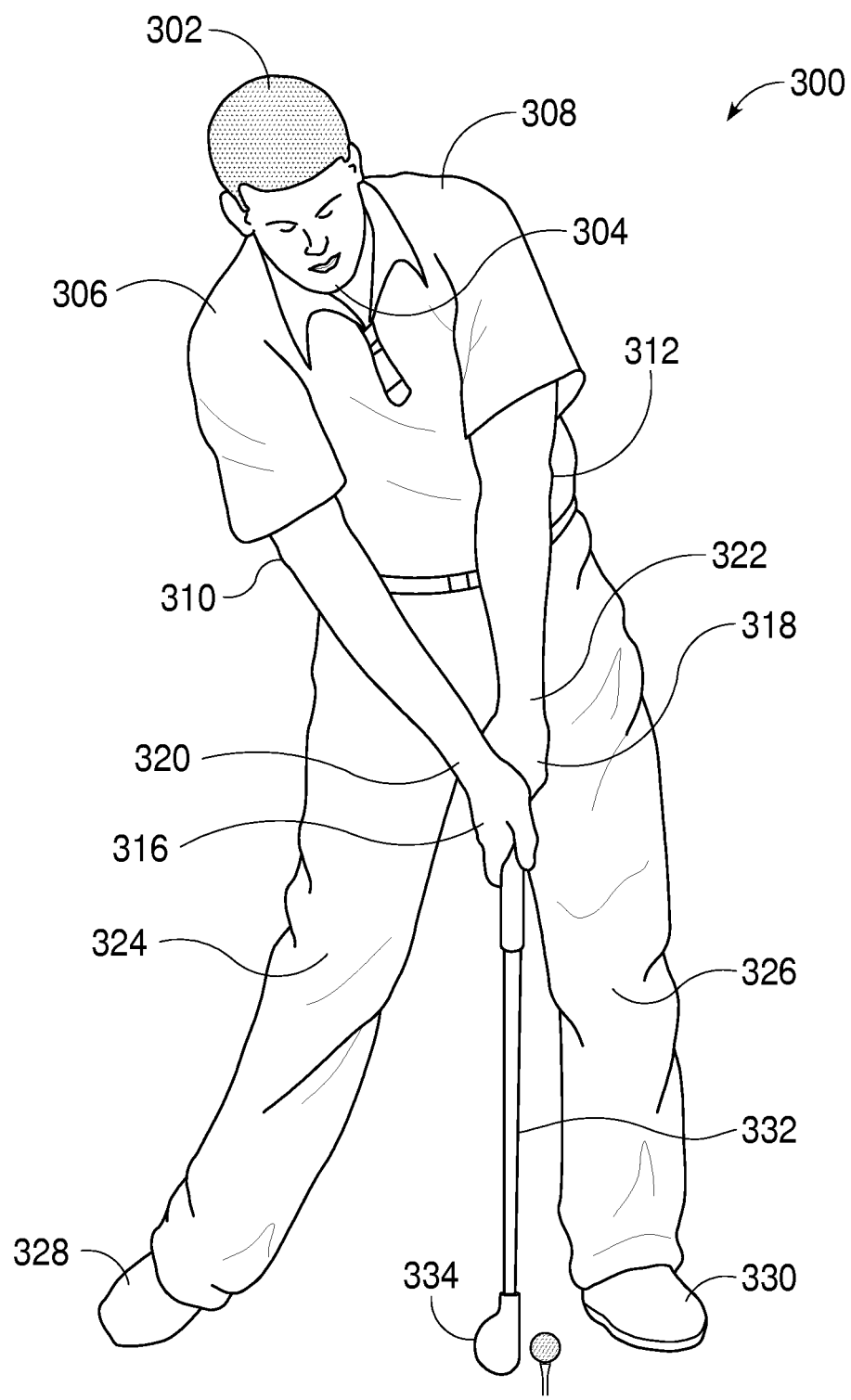
FIG. 3 is an example image of points on a target user, according to some implementations.

FIG. 3 is an example image of points on a target user 300, according to some implementations. In this particular implementation, target user 300 is a golfer who is about to swing a golf club. Shown are various points associated with target user 300. In various implementations, the points may include predetermined locations or areas on the body of target user 300. For example, shown is point 302 positioned at the head of target user 300 and point 304 positioned at the chin of target user 300.

In some implementations, points may include predetermined locations at various joints of the body of target user 300. For example, shown are points 306 and 308 positioned at the shoulder joints of target user 300, points 310 and 312 positioned at the elbows of target user 300, points 316 and 318 positioned at the wrists of target user 300, points 320 and 322 positioned at the hip joints of target user 300, points 324 and 326 positioned at the knees of target user 300, points 328 and 330 positioned at the ankles of target user 300.

In some implementations, points may include predetermined locations at non-body parts associated with target user 300. In some implementations, the points may also include points of a golf club held by the person. For example, shown is point 332 positioned at the shaft of the golf club, and point 334 positioned at the head of the golf club.

Also, there may be any number of points associated with the target user. For example, in other implementations, target user 300 may be associated with points or other types of elements instead of, or in addition to, those shown herein.

Figure 4:
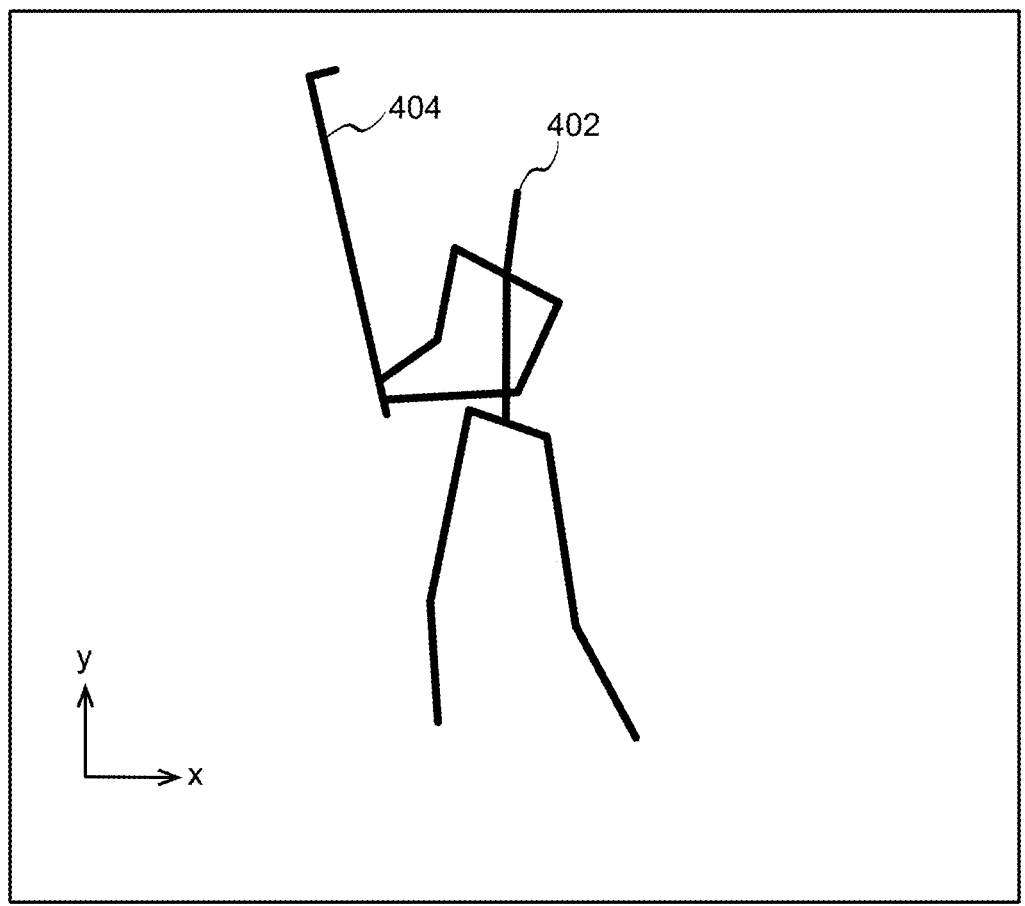
FIG. 4 is an example image of points on a person in a two-dimensional model, according to some implementations.

FIG. 4 is an example image of points on a person in a two-dimensional model 400, according to some implementations. As shown, a target user 402 is swinging a golf club 404. Target user 402 may represent target user U1 of FIG. 1 and/or target user 302 of FIG. 3. In various implementations, the 2D coordinates are pixel coordinates, which may be Cartesian coordinates (e.g., x,y coordinates) in an XY plane, as shown.

In various implementations, the system determines multiple points in each frame of the video, and determines or estimates their 2D coordinates in a 2D plane. For example, the system may determine points on the body of target user 402 and may optionally determine points on golf club 404 corresponding to the points shown in FIG. 3. For example, such points may include points at the top of the head of target user 402, at the chin of target user 402, at various joints of the body of target user 402 (e.g., at the shoulder joints, elbows, wrists, hip joints, knees, ankles, etc. In some implementations, the points may be augmented by points located at the shaft and/or head of golf club 404. The system may generate and store the 2D locations in any suitable file (e.g., in a JavaScript Object Notation (JSON) file, etc.) in any suitable storage location.

In various implementations, the system applies mean filtering to the determined points to eliminate outliers in the estimations of 2D point locations and to facilitate smooth transition from frame to frame. Estimations of the positions of some points may move dramatically from one 2D frame to the next 2D frame. The system may discard such points as outliers. For example, in various implementations, the system may compute the mean value (e.g., coordinates) of a given point between successive image frames. The system then compares a given value (e.g., of a particular coordinate) against the mean value. The system may give points with coordinates that deviate less from the mean value a higher confidence level, and may give points with coordinates that deviate more from the mean value a lower confidence level. The system then discards values with confidence levels that fall below a predetermined threshold. This reduces the estimation errors.

Referring still to FIG. 2, at block 206, the system converts 2D coordinates of the points to 3D coordinates. For example, the system converts point locations in 2D frames of a 2D video to point locations in a 3D environment model. In various implementations, to convert 2D coordinates of the points to 3D coordinates, the system converts the 2D coordinates for each frame of the video to 3D coordinates.

Figure 5:
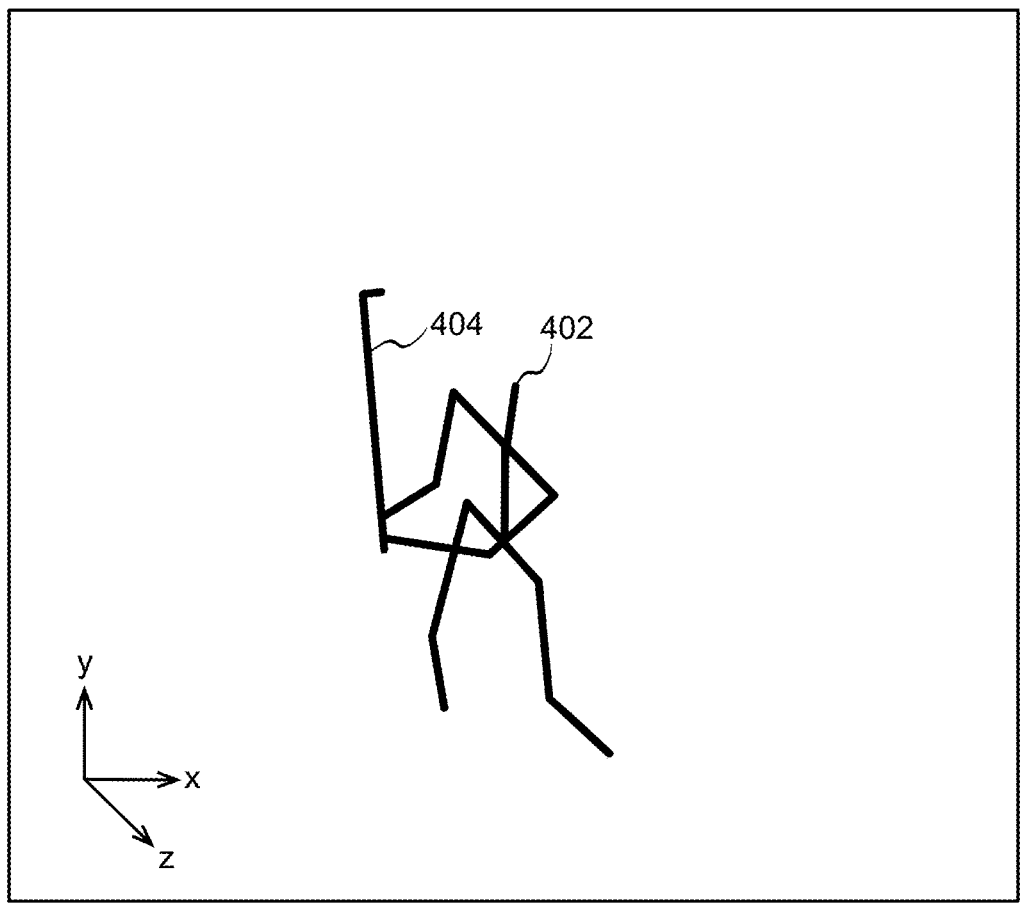
FIG. 5 is an example image of points on a person in a three-dimensional model, according to some implementations.

FIG. 5 is an example image of points on a person in a three-dimensional model 500, according to some implementations. As shown, target user 402 is swinging golf club 404. In various implementations, the 3D coordinates are Cartesian coordinates (e.g., x,y,z coordinates) in an XYZ plane.

The conversion for the system to use 3D coordinates provides more accurate and useful analysis of movement of a person than the system using 2D coordinates. For example, a professional golf player hits a ball using rotational motion of portions of his or her body. Such portions may include the hips, shoulders, arms, etc. The rotational motion of the body portions starts at the hips and then translates to the motion of the shoulders, then arms, then ultimately to golf club head through impact of the golf ball. In various implementations, the system may augment the image analysis described herein with sensor data (e.g., one or more sensors attached to the golf club, etc.). As such, the system converts 2D coordinates of body associated points (e.g., joints, etc.) and non-body associated points (e.g., portions of a golf club, etc.) to 3D coordinates in a 3D environment model.

In various implementations, The system may use various techniques for converting 2D coordinates of the points to 3D coordinates. For example, the system may convert from pixel locations in an image to 3D coordinates using machine learning approach, computer vision approach, etc.

With regard to a machine learning approach, in some implementations, the system may employ nearest neighbor techniques using a human pose data set. The system may find the nearest 2D pose in the data set and use the depth of the 2D pose to estimate the 3D location. The system then scales the 3D model accordingly to match the 2D estimation. In various implementations, the system augments the analysis by including data obtained from sensors that are attached to the golf club. As such, the data set will include the golf swing pose for more accuracy.

With regard to a computer vision approach, in some implementations, the system may employ 2D estimation, sensor position techniques, and/or general human body ratios to calculate 3D coordinates of the various points on the body of the target user, including optional points on the golf club. Because body ratios differ from person to person, sensor data may include some inaccuracies. The image analysis described herein is independent from and thus not reliant on any sensor data. As indicated herein, any sensor data analysis augments the image analysis.

In some implementations, in addition to sensor data, the system may also augment the image analysis with data from an optional 3D motion capture system in order to generate a 3D environment model. As a result, the system generates 6 degrees of freedom (6DOF) information (e.g., position and orientation) associated with all points (e.g., points on the head of the target user, joints of the target user, and sensors, if any.

Referring still to FIG. 2, at block 208, the system determines the movement of the points based at least in part on the 3D coordinates. In various implementations, the system determines various aspects of movement of different points and groups of points. Such movement aspects may include linear speed, linear acceleration, rotational speed, rotational acceleration, etc.

Groups of points constitute body segments. For example, body segments may include the points on the head (e.g., top of head, chin, bottom of head/top of neck, etc.), the shoulder joints, the arm joints, the leg joints, the points on the golf club, etc. Any two or more points may constitute a body segment, and the particular body segment will vary depending on the particular implementation. For example, a shoulder body segment may include the right shoulder and the left shoulder. An arm segment may include the right shoulder and the right elbow. An arm segment may alternatively include the right shoulder, the right elbow, and right wrist.

In various implementations, the system may determine pair-wise relationships and conditional dependencies between various combinations of points. For example, when the right shoulder goes up and back, the left should may go down and forward. In another example, the hips may start to rotate before the shoulders start to rotate.

As indicated herein, the system determines the change in the 2D coordinates of a given point between a given frame and the next frame. The system then estimates the corresponding 3D coordinates of that same point. The system also estimates the change in the 3D coordinates of that same point. These occur frame by frame and for multiple points of the target user.

In various scenarios, the range of movements of different body parts may vary. As such, the rotation speed of different body portions or segments may vary. Skilled golf players show a predictable sequence of motion for different types of swing techniques. The sequence of body movements is called the kinematic sequence. Professional golf players have the same kinematic sequence for a particular shot or technique, increasing the speed at a distal segment of the body. For example, professional golf players accelerate their hip rotation first, shoulders second, arms third, then wrists/hands, and finally the club head. Example implementations involving kinematic sequences are described in more detail below in connection with FIGS. 6 and 7, for example.

In various implementations, the system uses a deep learning approach and/or computer vision approach to determine swing characteristics based on the 3D coordinates. For example, in some implementations, the system may train a deep learning engine with 3D motion capture data to improve swing characteristics performed by a target user. In a computer vision example, in some implementations, the system may compare objects in an image frame to detect body joints and to generate a 3D environment or human body model. The system may then predict swing characteristics from the 3D environment/human body model.

Figure 6:
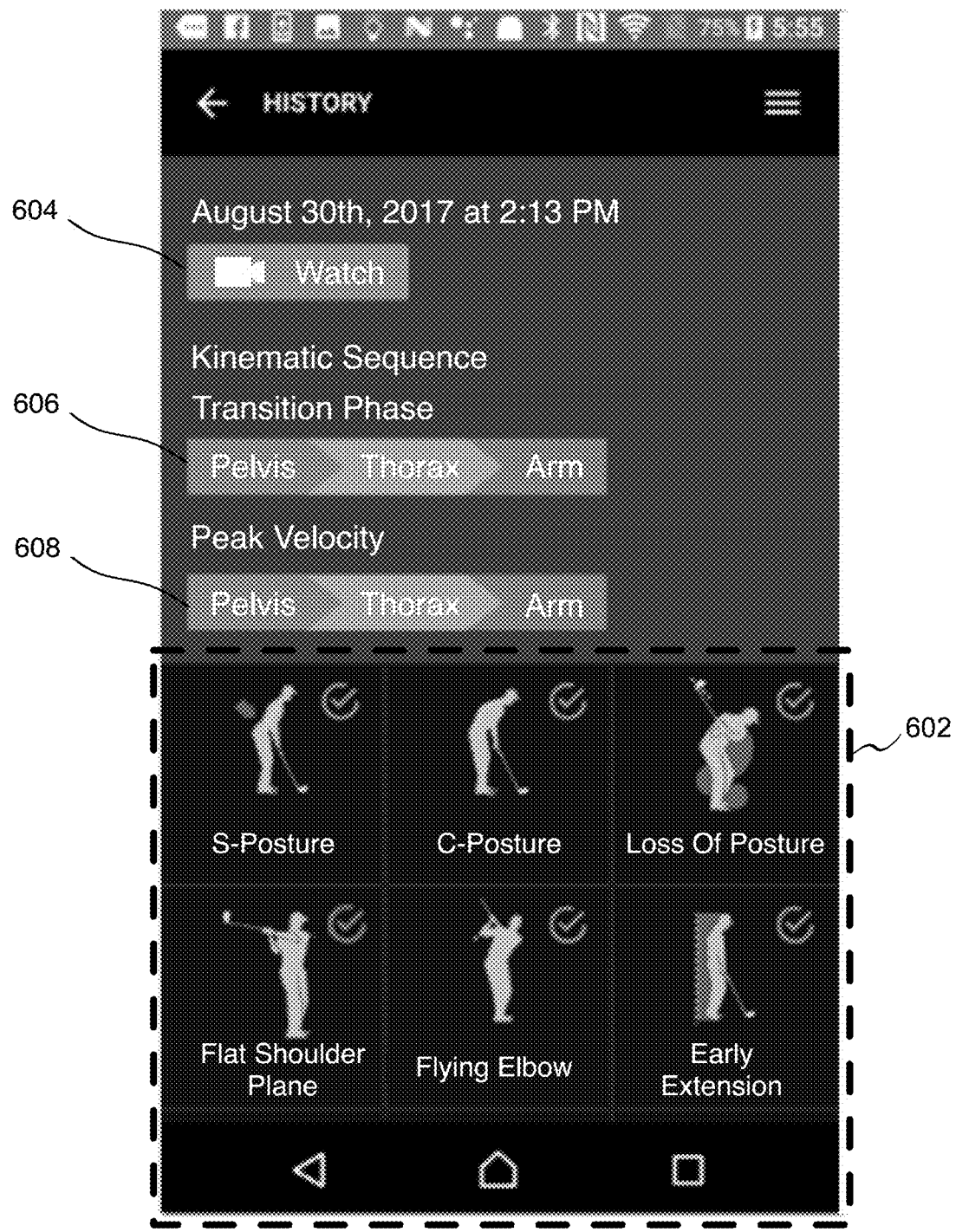
FIG. 6 is an example user interface showing information related to the movement of a target user, according to some implementations.

FIG. 6 is an example user interface 600 showing information related to the movement of a target user, according to some implementations. Shown are various buttons associated with different kinematic sequences. For example, shown are buttons 602. Buttons 602 are associated with kinematic sequences such as an S-posture, a C-posture, a loss of posture, a flat shoulder plane, a flying elbow, and an early extension. These are example kinematic sequences. There may be any number of kinematic sequences shown in user interface 600 and associated with the target user. For example, kinematic sequences may also include an over the top, a sway, a slide, a late buckle, a reverse spine angle, a forward lunge, a hanging back, a casting, a scooping, a chicken winging, etc. These kinematic sequences may vary, and will depend on the particular activity or sport, etc. In other implementations, user interface 600 may show other kinematic sequences instead of, or in addition to, those shown herein.

As shown, user interface 600 enables a user such as a target user, coach, practice partner, etc. to view particular kinematic sequence results associated the target user. For example, to view an S-Posture kinematic sequence, the use may select the appropriate button labeled S-Posture kinematic sequence.

In various implementations, the user interface may show various movement aspects for a given kinematic sequence. For example, the user interface may show the linear and/or rotational speed, the linear and/or rotational acceleration for any one or more points or groups of points (e.g., body segments).

In some implementations, the system enables the target user, or other user (e.g., coach, practice partner, etc.) to select a watch button 604 to watch one or more videos. In some implementations, selection of watch button 604 may cause a menu to appear. The menu may enable a user to watch a target user performing a particular action or may enable a user to watch a lesson. Shown are button 606 for showing a transition phase and button 608 for showing peak velocity, which are described in more detail in connection with FIG. 7, for example.

Figure 7:
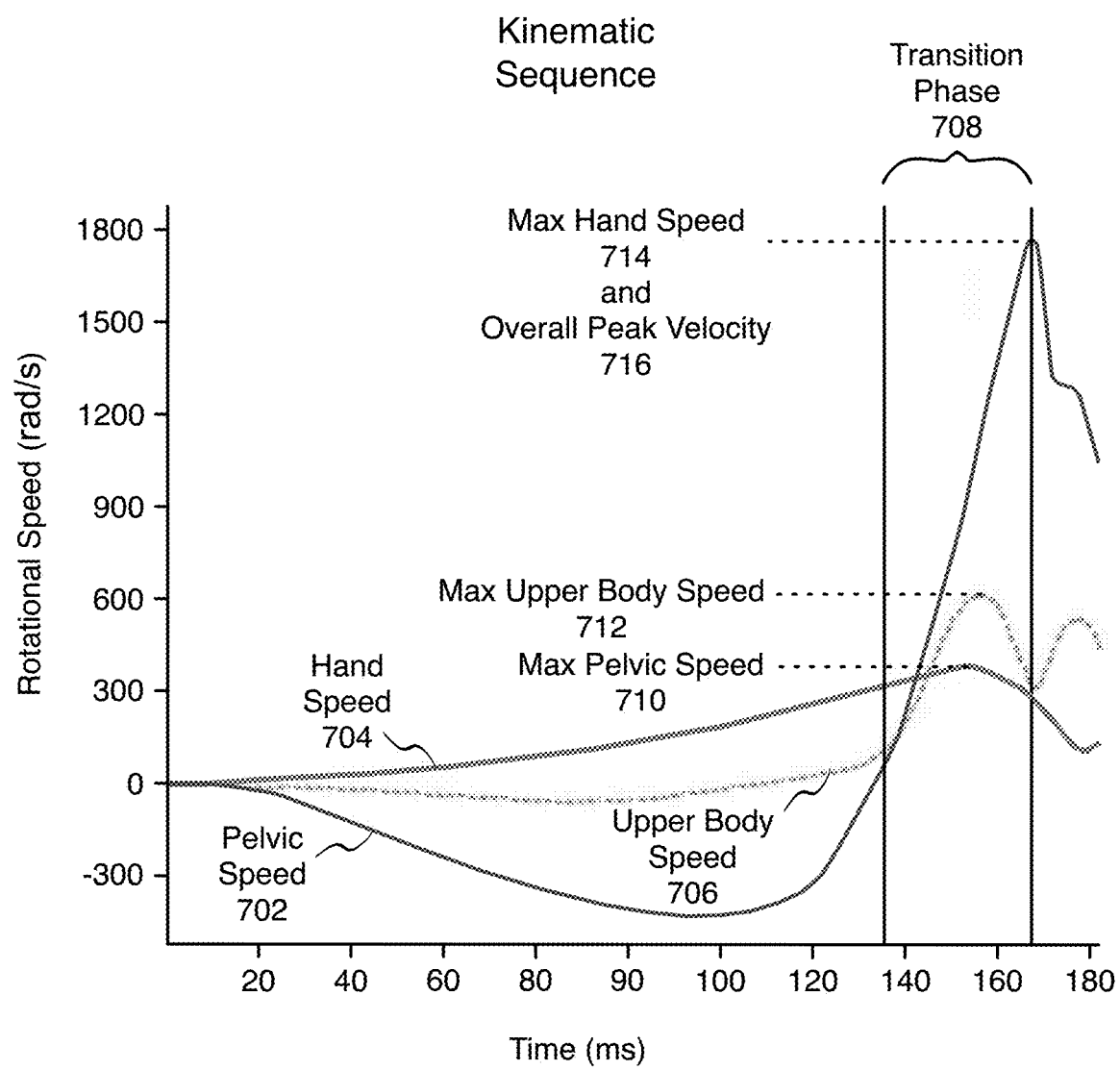
FIG. 7 is a graph showing an example kinematic sequence, according to some implementations.

FIG. 7 is a graph 700 showing an example kinematic sequence, according to some implementations. Shown are lines 702, 704, and 706 representing the speed of particular respective body segments such as the pelvis, upper body, and hands. The hands may represent the point where the target user is gripping the golf club. As shown, the x-axis indicates time and the y-axis indicates rotational speed (rotation around an axis). The particular units may vary, and will depend on the particular implementation. For example, time may be in milliseconds (ms), or other suitable units. Speed may be in radians per second, or other suitable units.

As indicated above, a professional golf player hits a ball using a rotational motion of portions of his or her body. Such portions may include the hips, shoulders, arms, etc. The rotational motion of the body portions starts at the hips and then translates to the motion of the shoulders, then arms, then ultimately to golf club head through impact of the golf ball.

Shown is the transition phase 708, which is between the time the target user sets up a swing to the time the target user strikes the golf ball with a golf club. Also shown in this example kinematic sequence, the pelvis reaches a maximum pelvic speed 710 before the upper body reaches a maximum upper body speed 712. Also the upper body reaches a maximum upper body speed 712 before the hands reach a maximum hand speed 714. In this example kinematic sequence, the kinematic sequence reaches an overall peak velocity 716 concurrently with the maximum hand speed 714.

In various implementations, the system may utilize sensors to augment input data associated with the points located on the target user's body. For example, in addition to determining the movement of the target user, including characterizing the movement, the system may include data obtained from one or more sensors mounted on a club. As such, the system may determine the swing trajectory in addition to determining the movement of points on the body of the target user.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 8:
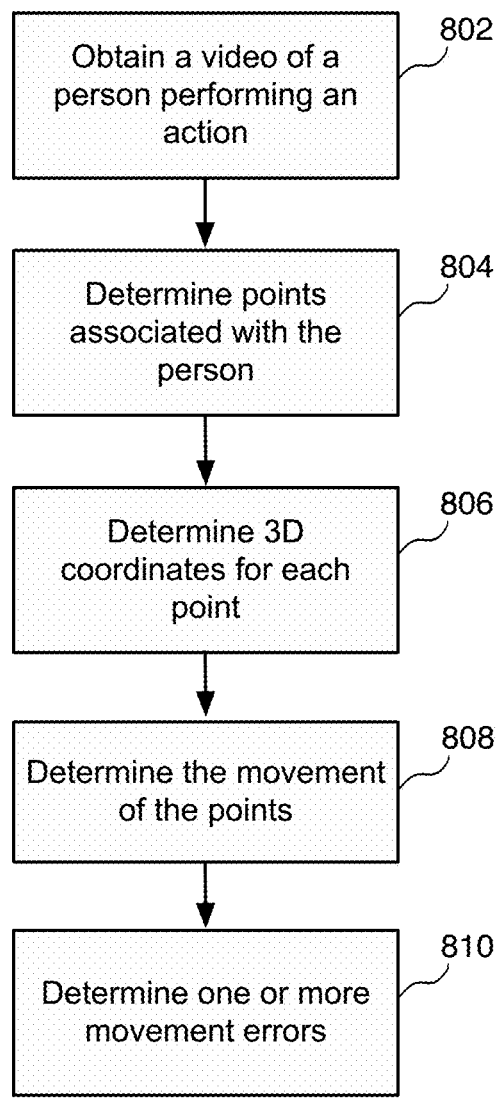
FIG. 8 is an example flow diagram for determining movement errors, according to some implementations.

FIG. 8 is an example flow diagram for determining movement errors, according to some implementations. As described in more detail herein, the system analyzes the posture of a person such as a golfer to detect and identify errors or faults in the person's swing, or other action or movement. Referring to FIGS. 1, 2, and 8, a method is initiated at block 802, where a system such as system 102 obtains a video of a person performing an action. In various implementations, the action is a golf swing. As indicated above, in various implementations, the video is captured by a two-dimensional camera, which may be a dedicated video camera or a camera that is integrated into another device such as a smart phone, tablet, etc. The video may be of a person swinging a golf club at a golf ball. The system may obtains the video of a person performing an action based on implementations described above in connection with block 202 of FIG. 2.

At block 804, the system determines, from the video, points associated with the person. In various implementations, the system determines the points for each frame of the video. As indicated above, in various implementations, the points include points of a body of the person such as the head and/or joints of the person. In various implementations, the points include points of a golf club held by the person. The system may determine points associated with the person based on implementations described above in connection with block 204 of FIG. 2.

At block 806, the system determines 3D coordinates for each point. In various implementations, the system determines the 3D coordinates of the points for each frame of the video. The system may determine 3D coordinates for each point based on implementations described above in connection with block 206 of FIG. 2.

At block 808, the system determines the movement of the points based at least in part on the 3D coordinates. The system may determine the movement of the points based on implementations described above in connection with block 208 of FIG. 2.

At block 810, the system determines one or more movement errors based at least in part on the movement of the points. For example, the system may detect and identify errors or faults in the person's swing. Example implementations directed to determining movement errors are described in more detail below in connection with FIG. 9, for example.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 9:
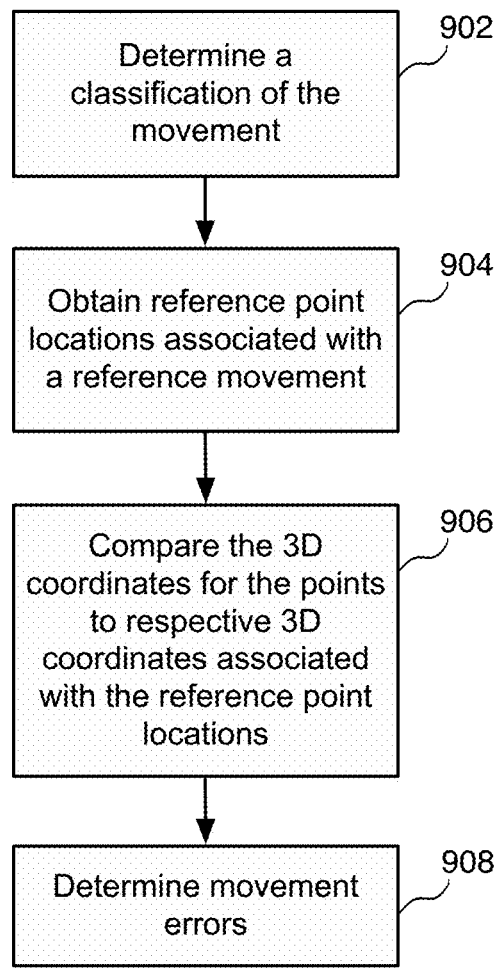
FIG. 9 is another example flow diagram for determining movement errors, according to some implementations.

FIG. 9 is another example flow diagram for determining movement errors, according to some implementations. Referring to both FIGS. 1 and 9, a method is initiated at block 902, where a system such as system 102 determines a classification of the movement. The classification of the movement may be referred to as the kinematic sequence. The system may determine 3D coordinates for each point based on implementations described above in connection with block 206 of FIG. 2. The system may then determine how the points move in 3D space. Based on the movement, the system determines the classification of the movement.

Figure 10:
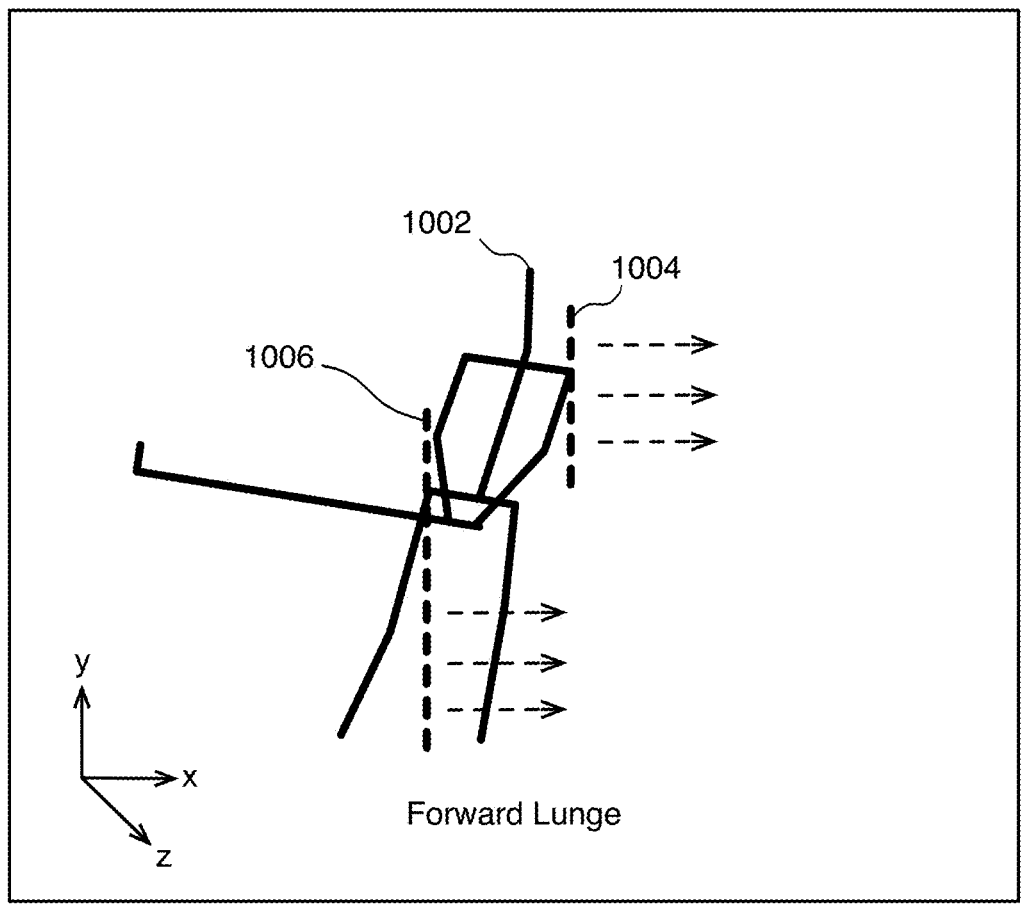
FIG. 10 is an example model of a target user performing a movement, according to some implementations.

FIG. 10 is an example model 1000 of a target user performing a movement, according to some implementations. Shown is a target user 1002. Based on the movement of the points, the system may determine and classify the action performed by the target user. In this particular example, the system may detect and track the direction and speed of the left shoulder (movement indicated by dashed line 1004). The system may also detect and track the direction and speed of the right hip (indicated by dashed line 1006). Based on this movement, the system may classify the overall movement as a forward lunge.

Figure 11:
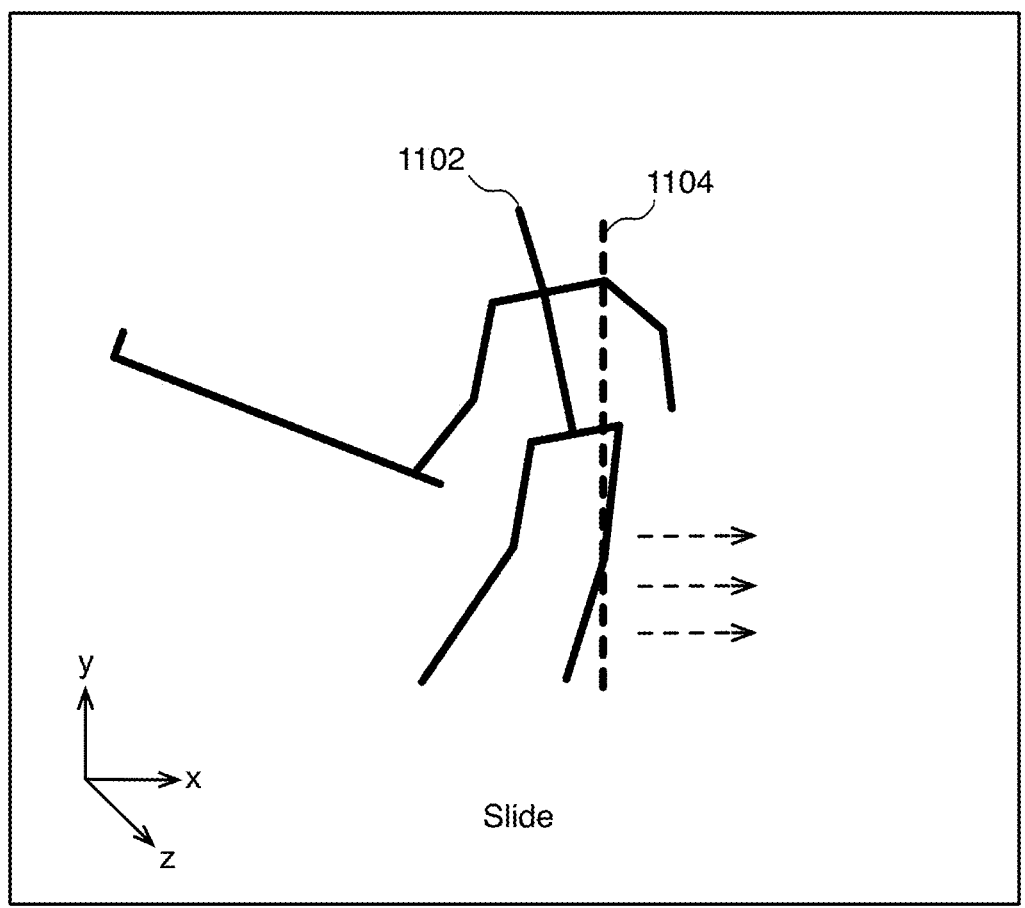
FIG. 11 is another example model of a target user performing a movement, according to some implementations.

FIG. 11 is another example model 1100 of a target user performing a movement, according to some implementations. Shown is target a user 1102. Based on the movement of the points, the system may determine and classify the action performed by the target user. In this particular example, the system may detect and track the direction and speed of the left shoulder (movement indicated by dashed line 1104). The system may also detect and track the direction and speed of other points, including points on the golf club as needed to distinguish from other movements. Based on this movement, the system may classify the overall movement as a slide.

At block 904, the system obtains reference point locations associated with a reference movement. In various implementations, the system obtains the reference point locations based at least in part on the classification of the movement. For example, the system may determine that the target user is performing a forward lunge based on the direction and movement of the target user's shoulders and hips. The system may then obtain (e.g., search, fetch, etc.) the reference point locations associated with a reference movement. The reference movement may be, for example, a reference kinematic sequence performed by a professional golfer.

At block 906, the system compares the 3D coordinates for the points to respective 3D coordinates associated with the reference point locations. In various implementations, the system compares the observed points associated with the target user to the respective reference points associated with a reference movement.

At block 908, the system determines the one or more movement errors based on the comparing. In some implementations, the system determines that an error has occurred when the difference between one or more observed points and one or more respective or corresponding reference points is greater than a predetermined error value. For example, their would be an error if the predetermined error value is one inch, and if the location in 3D coordinates of the observed point is greater than 1 inch from the location in 3D coordinates of the reference point. The actual predetermined error value may vary and will depend on the particular implementation. Also, the number of observed points that the system compares to reference points may vary and will depend on the particular implementation. In an example implementation, the system may determine one or more errors based on comparisons of 16 points, including points at the head, shoulders, arms, hips, legs, and golf club, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations automatically assesses and characterizes human movements in 3D based on 2D input. Implementations described herein also estimate kinematic sequence without any sensors on the human body. Implementations described herein also detect errors in movement or form of a person when performing an activity.

Figure 12:
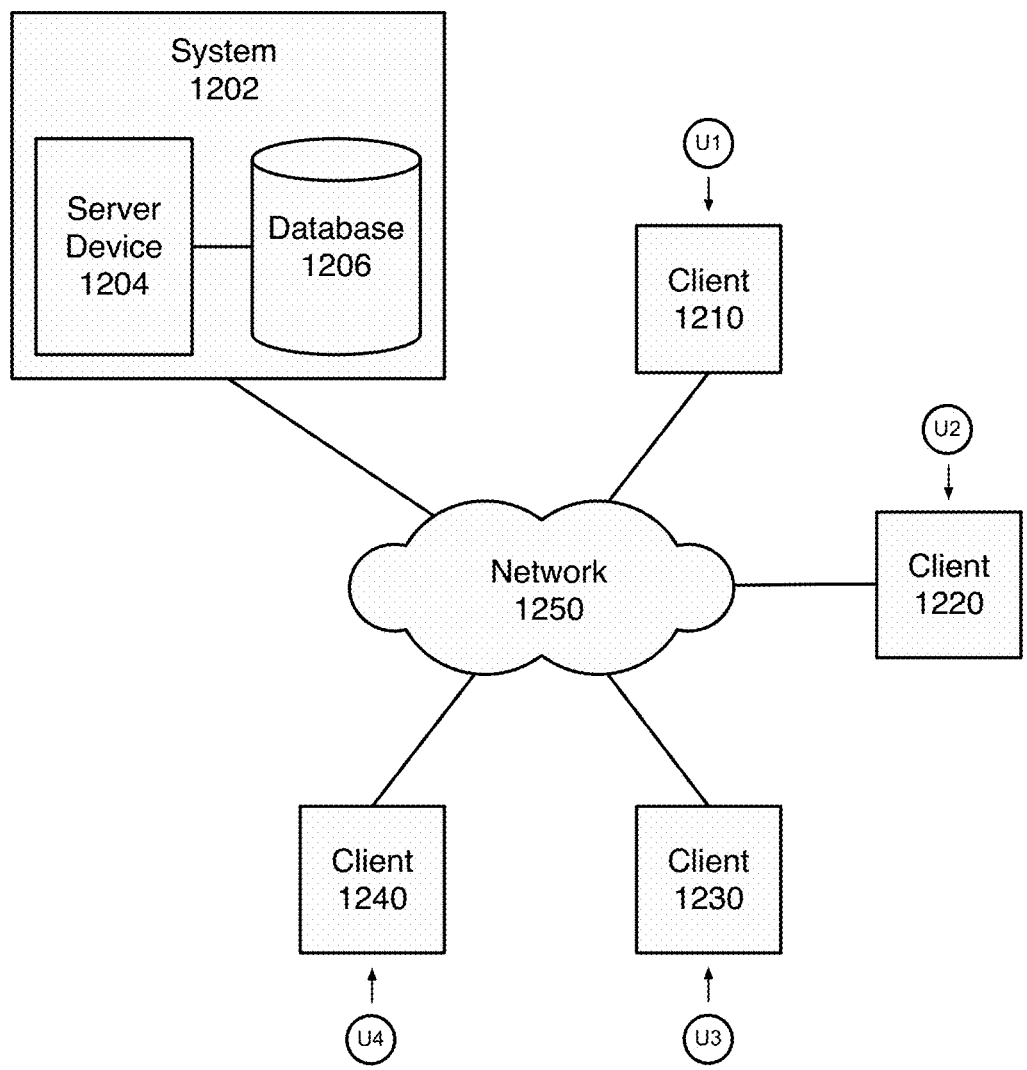
FIG. 12 is a block diagram of an example network environment, which may be used for implementations described herein.

FIG. 12 is a block diagram of an example network environment, which may be used for implementations described herein. In some implementations, network environment 1200 includes a system 1202, which includes a server device 1204 and a database 1206. Network environment 1200 also includes client devices 1210, 1220, 1230, and 1240, which may communicate with system 1202 and/or may communicate with each other directly or via system 1202. Network environment 1200 also includes a network 1250 through which system 1202 and client devices 1210, 1220, 1230, and 1240 communicate. Network 1250 may be any suitable communication network such as a Wi-Fi network, Bluetooth network, the Internet, etc.

In various implementations, system 1202 may be used to implement system 102 of FIG. 1. Also, client devices 1210, 1220, 1230, and 1240 may be used to implement client 104 of FIG. 1 or other clients capturing video of other target users.

For ease of illustration, FIG. 12 shows one block for each of system 1202, server device 1204, and network database 1206, and shows four blocks for client devices 1210, 1220, 1230, and 1240. Blocks 1202, 1204, and 1206 may represent multiple systems, server devices, and databases. Also, there may be any number of client devices. In other implementations, network environment 1200 may not have all of the components shown and/or may have other elements including other types of elements instead of, or in addition to, those shown herein.

While server 1204 of system 1202 performs embodiments described herein, in other embodiments, any suitable component or combination of components associated with server 1202 or any suitable processor or processors associated with server 1202 may facilitate performing the embodiments described herein.

Implementations may apply to any network system and/or may apply locally for an individual user. For example, implementations described herein may be implemented by system 1202 and/or any client device 1210, 1220, 1230, and 1240. System 1202 may perform the implementations described herein on a stand-alone computer, tablet computer, smartphone, etc. System 1202 and/or any of client devices 1210, 1220, 1230, and 1240 may perform implementations described herein individually or in combination with other devices.

In the various implementations described herein, a processor of system 1202 and/or a processor of any client device 1210, 1220, 1230, and 1240 causes the elements described herein (e.g., movement information, kinematic sequences, movement and form errors, etc.) to be displayed in a user interface on one or more display screens.

Figure 13:
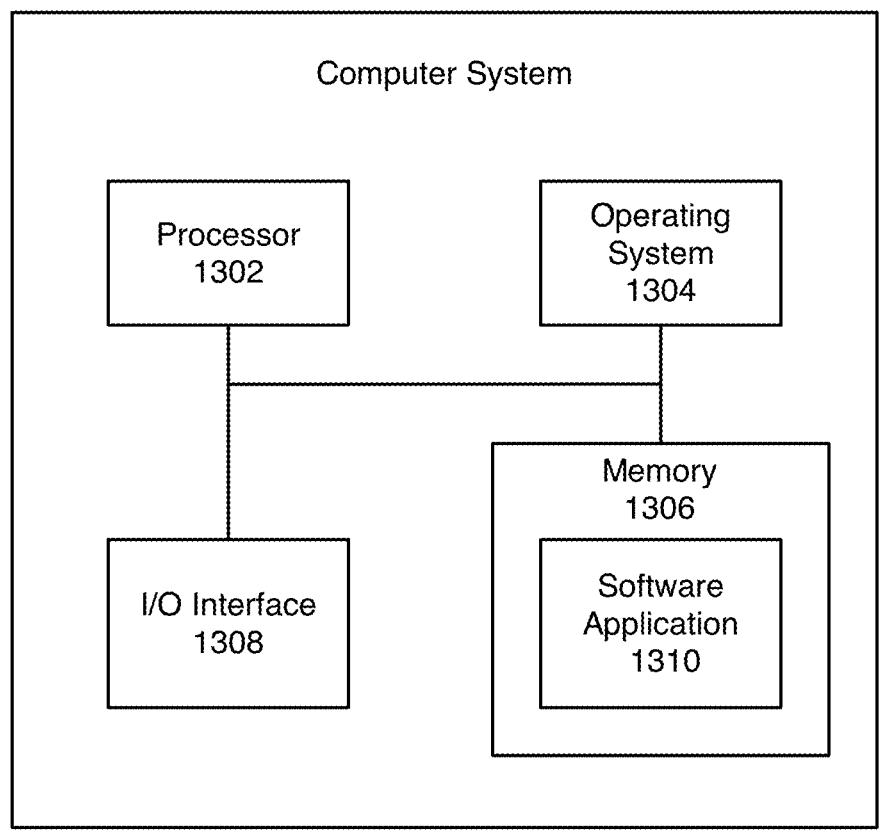
FIG. 13 is a block diagram of an example computer system 1300, which may be used for some implementations described herein.

FIG. 13 is a block diagram of an example computer system 1300, which may be used for some implementations described herein. For example, computer system 1300 may be used to implement system 102 and/or client 104 of FIG. 1, as well as to perform implementations described herein. In some implementations, computer system 1300 may include a processor 1302, an operating system 1304, a memory 1306, and an input/output (I/O) interface 1308. In various implementations, processor 1302 may be used to implement various functions and features described herein, as well as to perform the method implementations described herein. While processor 1302 is described as performing implementations described herein, any suitable component or combination of components of computer system 1300 or any suitable processor or processors associated with computer system 1300 or any suitable system may perform the steps described. Implementations described herein may be carried out on a user device, on a server, or a combination of both.

Computer system 1300 also includes a software application 1310, which may be stored on memory 1306 or on any other suitable storage location or computer-readable medium. Software application 1310 provides instructions that enable processor 1302 to perform the implementations described herein and other functions. Software application may also include an engine such as a network engine for performing various functions associated with one or more networks and network communications. The components of computer system 1300 may be implemented by one or more processors or any combination of hardware devices, as well as any combination of hardware, software, firmware, etc.

For ease of illustration, FIG. 13 shows one block for each of processor 1302, operating system 1304, memory 1306, I/O interface 1308, and software application 1310. These blocks 1302, 1304, 1306, 1308, and 1310 may represent multiple processors, operating systems, memories, I/O interfaces, and software applications. In various implementations, computer system 1300 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
obtaining a video of a person performing an action;
determining from the video a plurality of points associated with the person, wherein the determining of the plurality of points is performed for each frame of the video;
converting two-dimensional (2D) coordinates of the plurality of points to three-dimensional (3D) coordinates, wherein the converting is performed for each frame of the video; and
determining movements of the plurality of points based at least in part on the 3D coordinates, wherein the movements are tracked independently, and wherein the movements comprise a direction and speed of a first point of the plurality of points and comprise a direction and speed of a second point of the plurality of points, and wherein the movements are tracked independently.

2. The system of claim 1, wherein the action is a golf swing.

3. The system of claim 1, wherein the video is captured by a two-dimensional camera.

4. The system of claim 1, wherein the plurality of points comprises points of a body of the person.

5. The system of claim 1, wherein the plurality of points comprises points of a golf club held by the person.

6. The system of claim 1, wherein the 2D coordinates are pixel coordinates.

7. The system of claim 1, wherein the 3D coordinates are Cartesian coordinates.

8. A non-transitory computer-readable storage medium with program instructions stored thereon, the program instructions when executed by one or more processors are operable to cause the one or more processors to perform operations comprising:
obtaining a video of a person performing an action;
determining from the video a plurality of points associated with the person, wherein the determining of the plurality of points is performed for each frame of the video;
converting two-dimensional (2D) coordinates of the plurality of points to three-dimensional (3D) coordinates, wherein the converting is performed for each frame of the video; and
determining movements of the plurality of points based at least in part on the 3D coordinates, wherein the movements are tracked independently, and wherein the movements comprise a direction and speed of a first point of the plurality of points and comprise a direction and speed of a second point of the plurality of points, and wherein the movements are tracked independently.

9. The computer-readable storage medium of claim 8, wherein the action is a golf swing.

10. The computer-readable storage medium of claim 8, wherein the video is captured by a two-dimensional camera.

11. The computer-readable storage medium of claim 8, wherein the plurality of points comprises points of a body of the person.

12. The computer-readable storage medium of claim 8, wherein the plurality of points comprises points of a golf club held by the person.

13. The computer-readable storage medium of claim 8, wherein the 2D coordinates are pixel coordinates.

14. The computer-readable storage medium of claim 8, wherein the 3D coordinates are Cartesian coordinates.

15. A computer-implemented method comprising:
obtaining a video of a person performing an action;
determining from the video a plurality of points associated with the person, wherein the determining of the plurality of points is performed for each frame of the video;
converting two-dimensional (2D) coordinates of the plurality of points to three-dimensional (3D) coordinates, wherein the converting is performed for each frame of the video; and
determining movements of the plurality of points based at least in part on the 3D coordinates, wherein the movements are tracked independently, and wherein the movements comprise a direction and speed of a first point of the plurality of points and comprise a direction and speed of a second point of the plurality of points, and wherein the movements are tracked independently.

16. The method of claim 15, wherein the action is a golf swing.

17. The method of claim 15, wherein the video is captured by a two-dimensional camera.

18. The method of claim 15, wherein the plurality of points comprises points of a body of the person.

19. The method of claim 15, wherein the plurality of points comprises points of a golf club held by the person.

20. The method of claim 15, wherein the 2D coordinates are pixel coordinates.

* * * * *